(12) United States Patent
Tong et al.

(10) Patent No.: US 11,788,676 B2
(45) Date of Patent: Oct. 17, 2023

(54) DOCKING STATION FOR A HEAD BLOCK ASSEMBLY

(71) Applicant: RAM LIFTING TECHNOLOGIES PTE. LTD., Singapore (SG)

(72) Inventors: Zhan Min Tong, Singapore (SG); Ghee Hua Ng, Singapore (SG)

(73) Assignee: RAM LIFTING TECHNOLOGIES PTE. LTD., Singapore (SG)

( * ) Notice: Subject to any disclaimer, the term of this patent is extended or adjusted under 35 U.S.C. 154(b) by 181 days.

(21) Appl. No.: 17/278,182

(22) PCT Filed: Sep. 3, 2019

(86) PCT No.: PCT/SG2019/050439
§ 371 (c)(1),
(2) Date: Mar. 19, 2021

(87) PCT Pub. No.: WO2020/060483
PCT Pub. Date: Mar. 26, 2020

(65) Prior Publication Data
US 2021/0348713 A1  Nov. 11, 2021

(30) Foreign Application Priority Data

Sep. 20, 2018 (SG) ............................ 10201808199X

(51) Int. Cl.
*F16M 11/22* (2006.01)
*B60P 3/00* (2006.01)

(52) U.S. Cl.
CPC ................ *F16M 11/22* (2013.01); *B60P 3/00* (2013.01)

(58) Field of Classification Search
CPC ........ B62D 33/03; B62D 33/02; B62D 33/00; B62D 21/14; B62D 53/067; B60P 3/28; B66C 1/102; B66C 1/104; B66C 1/10
See application file for complete search history.

(56) References Cited

U.S. PATENT DOCUMENTS

| 5,494,309 | A  | * | 2/1996  | Roy ..................... B62D 53/067 |
| | | | | 280/401 |
| 10,457,486 | B1 | * | 10/2019 | Ulmer ..................... B60P 1/435 |
| 11,511,886 | B1 | * | 11/2022 | Tian ........................ B62D 33/03 |
| 2007/0296228 | A1 | | 12/2007 | Mills et al. |
| 2012/0006779 | A1 | | 1/2012  | Mills et al. |
| 2018/0304942 | A1 | * | 10/2018 | Schattgen ............ B62D 53/067 |
| 2022/0032835 | A1 | * | 2/2022  | Schwartzrock ......... B66C 23/54 |

FOREIGN PATENT DOCUMENTS

WO       2017141005 A1     8/2017

OTHER PUBLICATIONS

International Search Report and Written Opinion dated Nov. 21, 2019, PCT Patent Application No. PCT/SG2019/050439, filed Sep. 3, 2019, Australian Patent Office, 9 pages.

* cited by examiner

*Primary Examiner* — Kaitlin S Joerger
(74) *Attorney, Agent, or Firm* — Mannava & Kang, P.C.

(57) ABSTRACT

A docking station comprising a first frame arranged to receive a first head block assembly; and a second frame moveably coupled to the first frame by an engagement assembly, wherein the engagement assembly is arranged to selectively move the second frame from a retracted position to an extended position so as to allow the second frame to receive a second head block assembly engageable by the docking station.

11 Claims, 9 Drawing Sheets

DOCKING STATION FOR A HEAD BLOCK ASSEMBLY

PRIORITY

The present application is a national stage filing under 35 U.S.C 371 of PCT application number PCT/SG2019/050439, having an international filing date of Sep. 3, 2019, which claims priority to Singaporean patent application number 10201808199X, having a filing date of Sep. 20, 2018, the disclosures of which are hereby incorporated by reference in their entireties.

FIELD OF INVENTION

The invention relates to a docking station for a head block assembly. Specifically, the present invention relates to a mobile docking station.

BACKGROUND

Crane spreaders are frequently used in the shipping industry to lift shipping containers. These spreaders are often engaged beneath head blocks, and lifted by cranes. Recent inventions yield customizable engagement systems that allow cranes to engage either one or two head blocks at one go. Such engagement systems require a docking station for switching between a one head block configuration and a two head block configuration.

There are two kinds of docking stations available, namely: a mobile docking station and a docking station mounted on the crane sill beam. Mobile docking station is essentially a docking station mounted on a vehicle, such as a AGV (driverless Automated Guided Vehicle) or trailer towed around by a towhead truck. As the mobile docking station has to accommodate two head block assemblies side by side, the width of the docking station and hence, the trailer bed, has to be more than double the width of one head block assembly. A standard trailer is too narrow to accommodate the width of the docking station and hence, the mobile docking station will require a customized trailer built specially for this purpose. This will substantially increase the cost of construction of the mobile docking station.

Furthermore, as the customized trailer has a large width, it will occupy two standard lanes and require a big turning radius. This substantially decreases the maneuverability of the trailer, while also raising significant safety concerns when travelling on the road.

It would therefore be desirable to provide a mobile docking station which overcomes or alleviates the above disadvantages, or which at least provides a useful alternative.

SUMMARY OF INVENTION

In accordance with a first aspect of the present invention, there is provided a docking station comprising a first frame arranged to receive a first head block assembly; and a second frame moveably coupled to the first frame by an engagement assembly, wherein the engagement assembly is arranged to selectively move the second frame from a retracted position to an extended position so as to allow the second frame to receive a second head block assembly engageable by the docking station.

Accordingly, the present invention provides a mobile docking station that can be mounted on a standard trailer without the need for a customized trailer. As a result, there is no need to manufacture a customized trailer for this purpose, thereby reducing the cost of construction of the mobile docking station.

Furthermore, the mobile docking station will only occupy one lane when on the move and will also require a smaller turning radius as compared to that of the current mobile docking stations. As a result, the maneuverability and safety of the mobile docking station will be enhanced.

In embodiments of the present invention, the engagement assembly may further comprise a pivoting mechanism arranged to allow rotation of the second frame relative to the first frame about at least one principal axis. Accordingly, this allows the second frame to be in the retracted position while it is on the move, and only extend to its extended position once it is in position and ready to receive the second head block.

In embodiments of the present invention, the second frame further comprises at least one rigger leg pivotally coupled to the second frame, the rigger leg is arranged to contact the ground and support the second frame when the second frame is in the extended position. The rigger legs function to support the weight of the second frame and the second head block assembly that will subsequently be placed on it.

In embodiments of the present invention, the first frame further comprises a plurality of corner flare guides arranged to engage a first head block assembly engageable by the docking station. The corner flare guides are arranged to engage the head block assemblies when it is placed on the first frame. This prevents accidental shifting of the head block assembly, thereby enhancing the safety of the docking station.

In embodiments of the present invention, the engagement assembly may further comprise a plurality of pairs of parallel beams arranged to allow rotation of the second frame relative to the first frame. In an exemplary embodiment, the engagement assembly further comprises a hinge mechanism arranged to allow rotation of both the first frame and the second frame about at least one principal axis. The first and second frames may rotate in opposite directions from each other. Furthermore, the first and second frames may undergo a rotation in a parallelogram arrangement such that the first and second frames will remain parallel to each other during the rotation. Such an arrangement allows for a smaller docking station when the first and second frames are in the retracted position. As such, the docking station can be easily transported by a standard trailer.

In embodiments of the present invention, the engagement assembly may further comprise a plurality of linkages coupled to at least one linear actuator, the linear actuator arranged to selectively move the second frame horizontally, and then vertically, from the retracted position to the extended position.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

DETAILED DESCRIPTION

Figure 1:
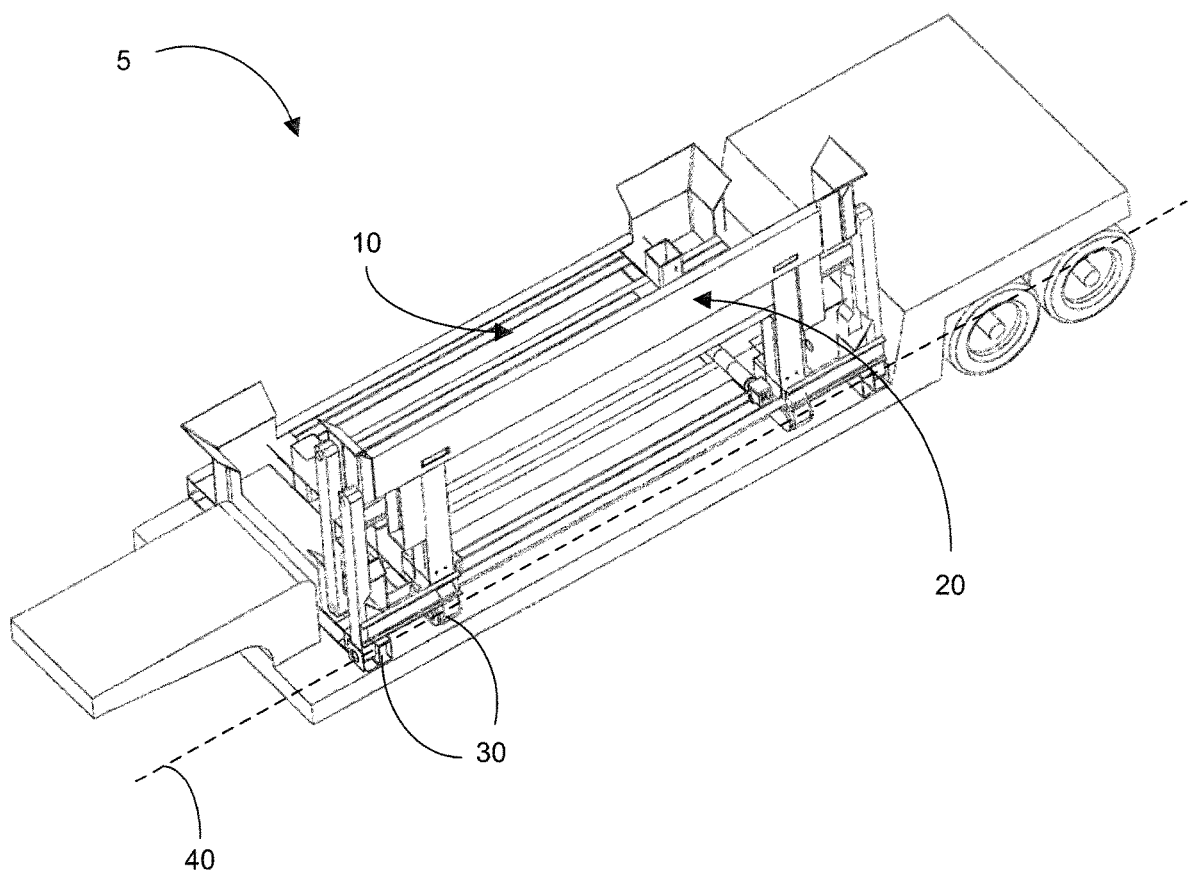
FIG. 1 is a perspective view of a docking station in a retracted position according to one embodiment of the present invention.
Figure 2:
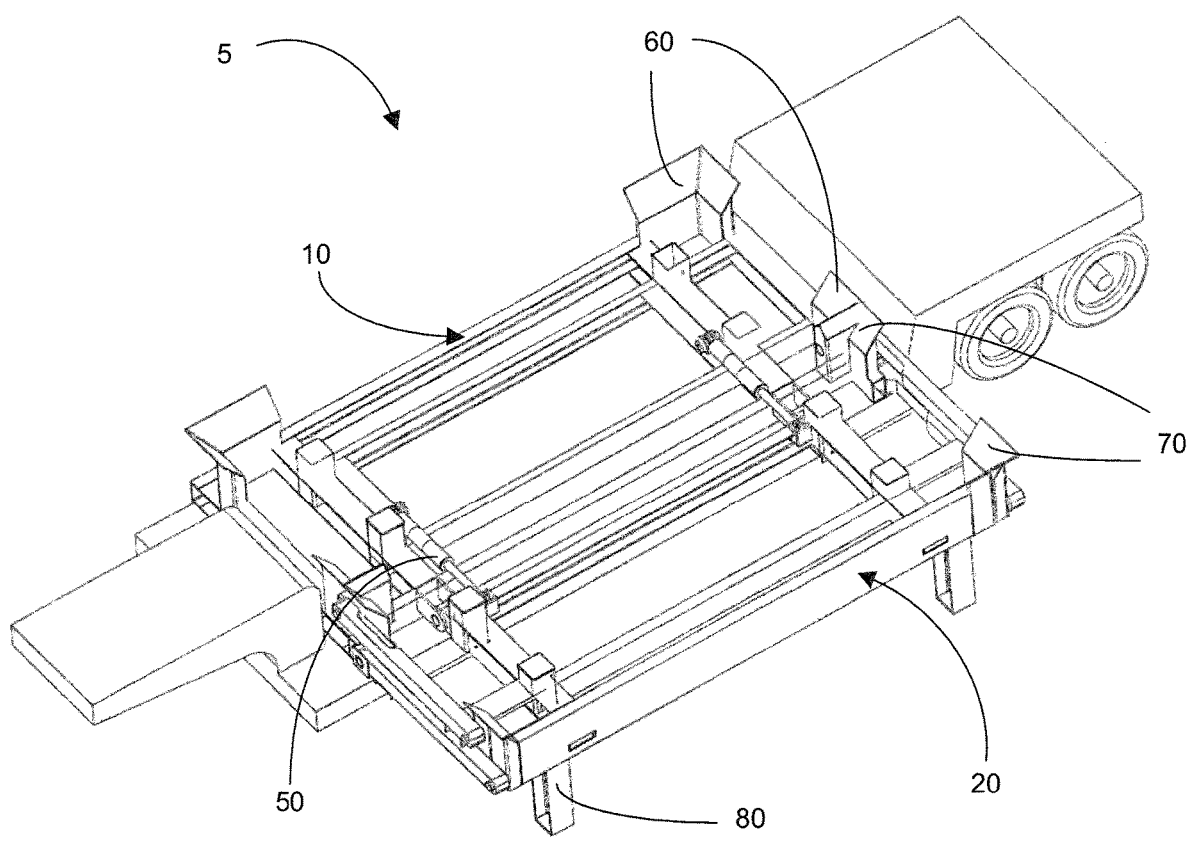
FIG. 2 is a perspective view of a docking station in an extended position according to one embodiment of the present invention.

FIGS. 1 and 2 show a docking station 5 according to one embodiment of the present invention. In this embodiment, the docking station comprises a first frame 10 for receiving a first head block assembly engageable by the docking station, and a second frame 20 moveably coupled to the first frame by an engagement assembly. The engagement assembly is arranged to selectively move the second frame from a retracted position, as shown in FIG. 1, to an extended position, as shown in FIG. 2, so as to allow the second frame 20 to receive a second head block assembly engageable by the docking station.

It will be appreciated that the head block assembly of the present invention may comprise only a head block, or a spreader coupled beneath the head block.

In the illustrated embodiment, the docking station is mounted on a vehicle, such as a trailer towed by a truck. However, it will also be appreciated that the docking station can also be a fixed docking station secured to another fixed structure.

In an embodiment of the present invention as shown in FIGS. 1 and 2, the engagement assembly further comprises a pivoting mechanism 30 arranged to allow the second frame 20 to rotate about a longitudinal axis 40 of the first frame 10 from the retracted position to the extended position. The pivoting mechanism may be pin connections, hinge joints, ball and socket joints or any other mechanism that allows rotation of the second frame about at least one principal axis. Actuators 50 are also provided on the docking station 5 so as to rotate the second frame about the longitudinal axis of the first frame without any manual intervention. For example, the actuators 50 may be controlled by an operator using a handheld wireless controller. The actuators 50 may be hydraulic actuators, linear actuators, rotary actuators or any other actuators that allows automatic movement of the first and second frames 10, 20 relative to each other.

In addition, as depicted in FIG. 2, the first and second frames 10, 20 have attached thereto a plurality of corner flare guides 60, 70 for engaging the first and second head block assemblies, respectively. In this embodiment, the corner flare guides are mechanical flare guides arranged to engage the first and second head block assemblies.

Rigger legs 80 are further provided on the second frame 20 so as to contact the ground and provide support for the second frame 20 when it is in the extended position. In this illustrated embodiment, the rigger legs 80 are rotatably coupled to the second frame 20 and mechanically linked to the action of actuator 50 so as to extend out when the second frame 20 is in the extended position such that the rigger legs 80 are perpendicular to the ground, and retract into the second frame 20 when the second frame 20 is in the retracted position without the need for manual intervention. Alternatively, leg actuators (not shown) may also be provided so as to move the rigger legs 80 without the need for manual intervention. The leg actuators may be hydraulic actuators, linear actuators, rotary actuators or any other actuators that allow automatic movement of the rigger legs 80 relative to the second frame.

Figure 3:
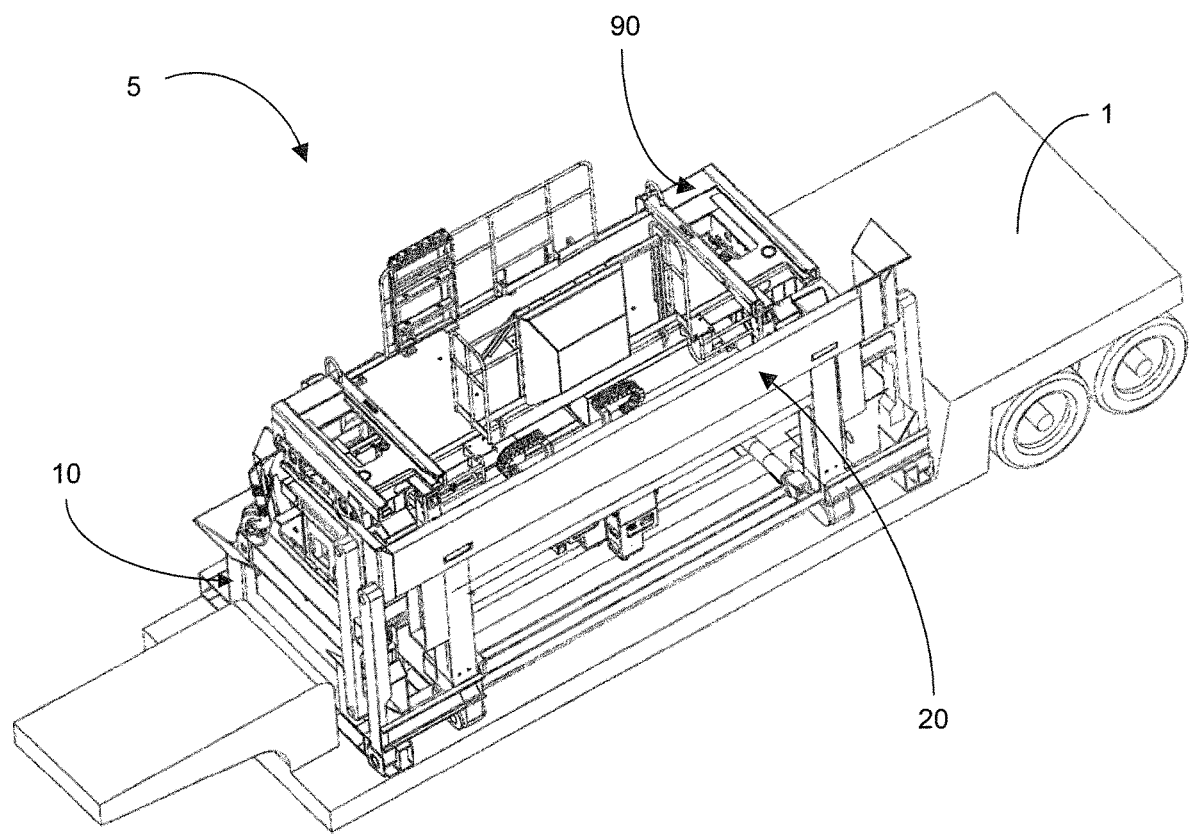
FIG. 3 is a perspective view of a docking station in the retracted position with a head block assembly mounted thereto according to one embodiment of the present invention.
Figure 4:
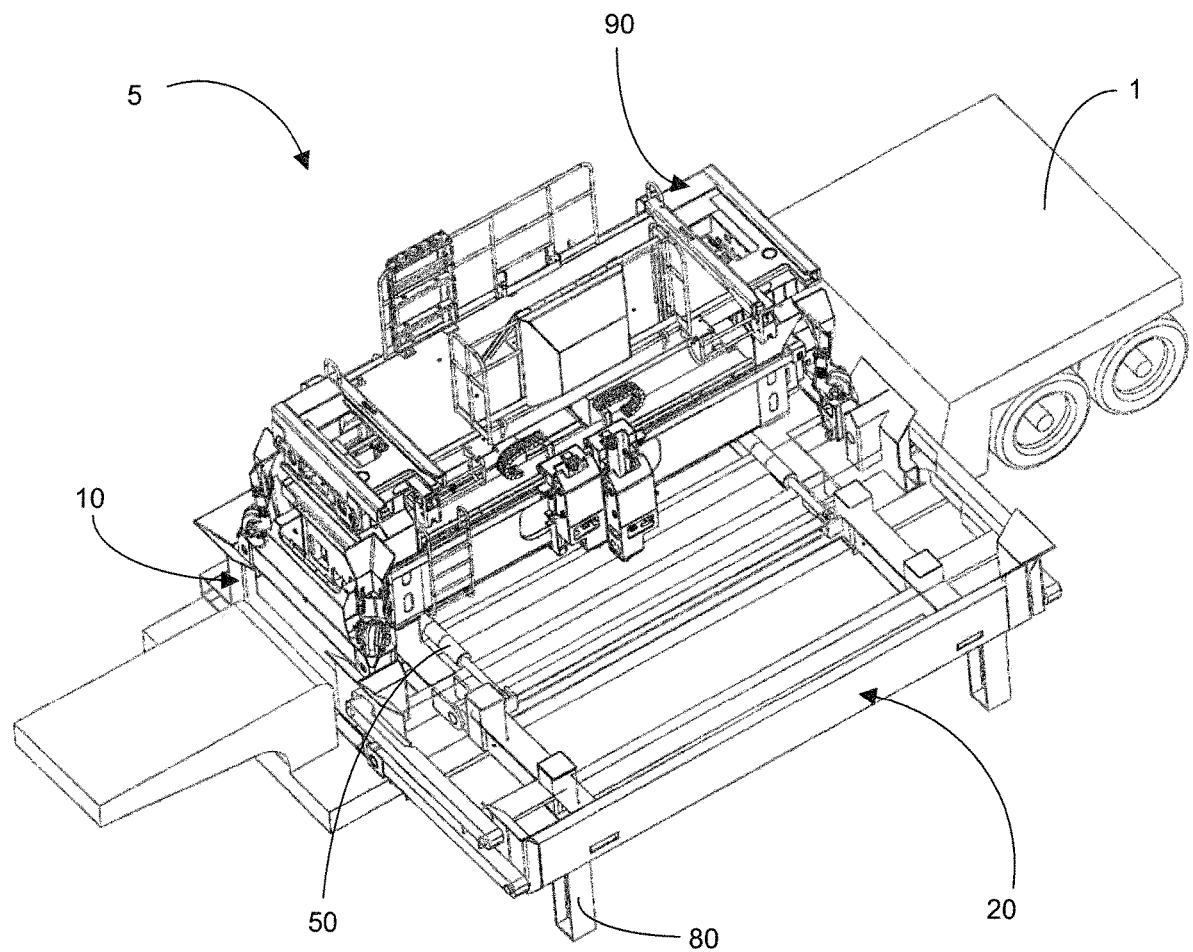
FIG. 4 is a perspective view of a docking station in the extended position with a head block assembly placed thereto according to one embodiment of the present invention.
Figure 5:
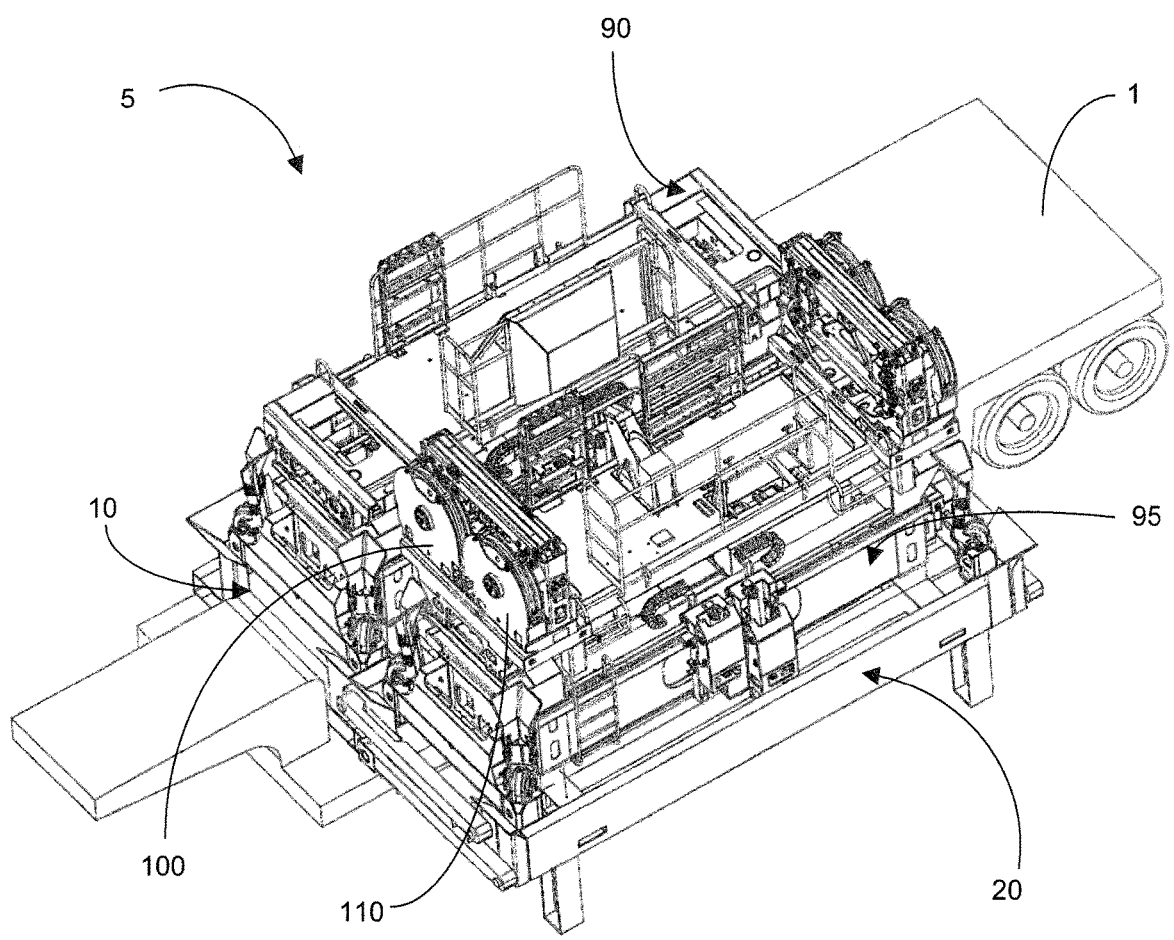
FIG. 5 is a perspective view of a docking station in the extended position with two head block assemblies placed thereto according to one embodiment of the present invention.

FIGS. 3 to 6 depicts the operation of the docking station in further detail. As shown in FIG. 3, the docking station 5, having a first head block assembly 90 mounted thereto, is mounted on a trailer 1, or an AGV (driverless Automated Guided Vehicle), and transported to the vicinity of a crane. At this stage, the second frame 20 is in a retracted position. Once the trailer reaches its intended position, the operator will actuate the actuators 50, causing the second frame to rotate about the longitudinal axis of the first frame so as to arrive at an extended position. This can be done either within the vicinity of the docking station, or remotely from a remote control room. At the same time, the rigger legs 80 will extend out such that it is perpendicular to the ground when the second frame 20 is in the extended position. This allows the rigger legs 80 to bear the load of the second frame 20 and also the weight of the second head block assembly 95 that will subsequently be placed on it (FIG. 5).

Figure 6:
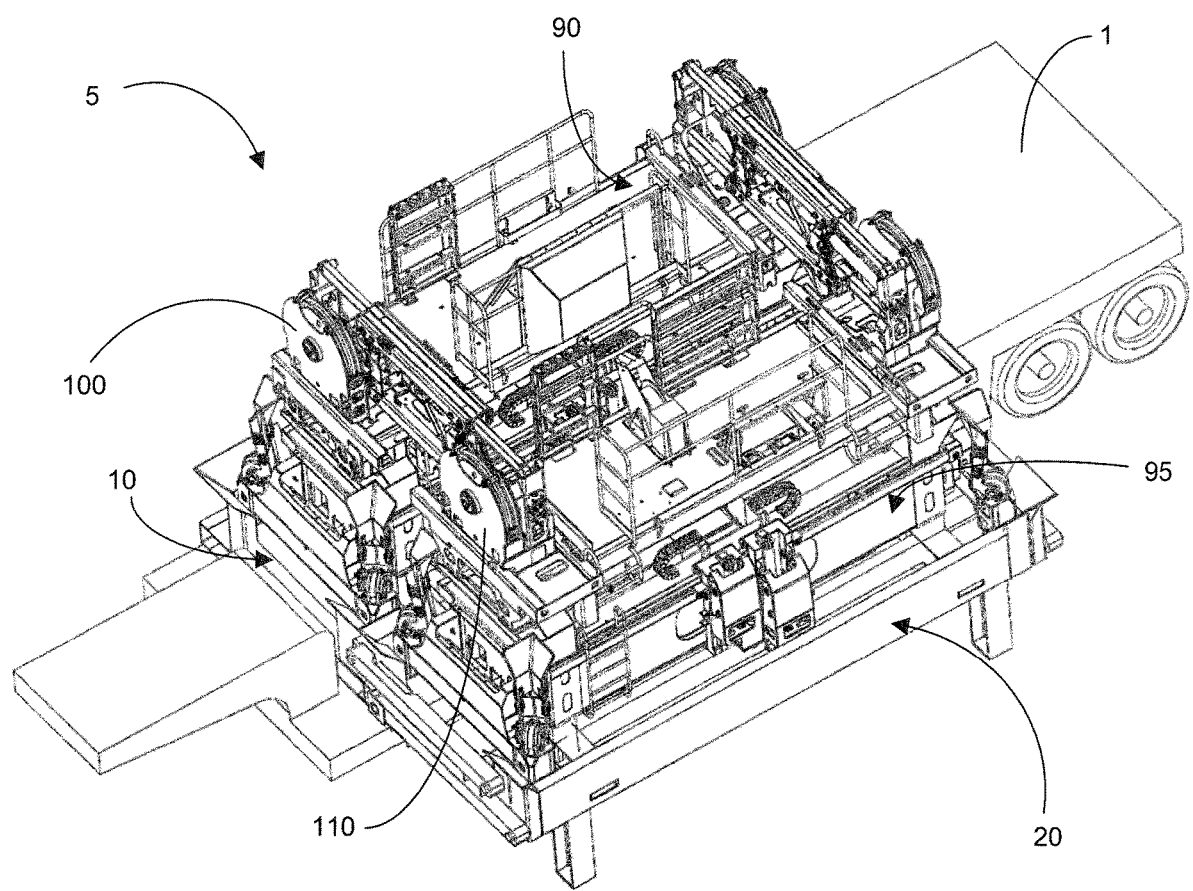
FIG. 6 is a perspective view of a docking station in the extended position with two head block assemblies placed thereto according to one embodiment of the present invention.

As shown in FIG. 5, after the second frame 20 and the rigger legs 80 are in their respective extended positions, a second head block assembly 95 (or otherwise also known as the main head block assembly) will land on the second frame of the docking station 5. In this regard, as illustrated, the second head block assembly 95 comprises two sheaves 100, 110 mounted at the top of the second head block assembly 95. The first sheave 100 will be disengaged from the second head block assembly 95, and mounted onto the first head block assembly 90, thereby allowing a crane to lift both the first and second head block assemblies 90, 95 simultaneously (FIG. 6).

Once the first and second head block assemblies 90, 95 have been lifted, the operator will actuate the actuators 50 so as to bring the second frame 20 back to its retracted position (as shown in FIG. 1).

To this end, the present invention provides a mobile docking station 5 that can be mounted on a standard trailer without the need for a customized trailer. In particular, the docking station 5 will be in the retracted position while it is on the move, and will only extend to its extended position once it is in position and ready to receive the second head block assembly from the crane. Hence, the width of the docking station, when it is in the retracted position, will be similar to that of the standard trailer and therefore, the docking station can be directly mounted onto the trailer. It follows therefore that the trailer will only occupy one lane while it is on the move (as compared to two lanes as of the prior art), and hence, requires a much smaller turning radius as compared to that of the prior art. As a result, the maneuverability and safety of the trailer will be enhanced.

In further embodiments of the present invention, the operator may also actuate the docking station remotely from an operation control building. In this case, the docking station may be used in a fully automated port, wherein the docking station is mounted on an AGV (driverless Automated Guided Vehicle). An operator will be stationed in the operation control building to control the extension and retraction of the second frame. In this instance, the operator views the docking station through a video feed. When the docking station has reached its intended position, the operator will push a control button to extend the second frame, and the signal will be sent through a wireless system to the AGV that carries the docking station thereby instructing the docking station to move to its extended position. Accordingly, the docking station may be actuated remotely from a distance, thereby allowing one operator to remotely control several docking stations at any one instance.

Figure 7A:
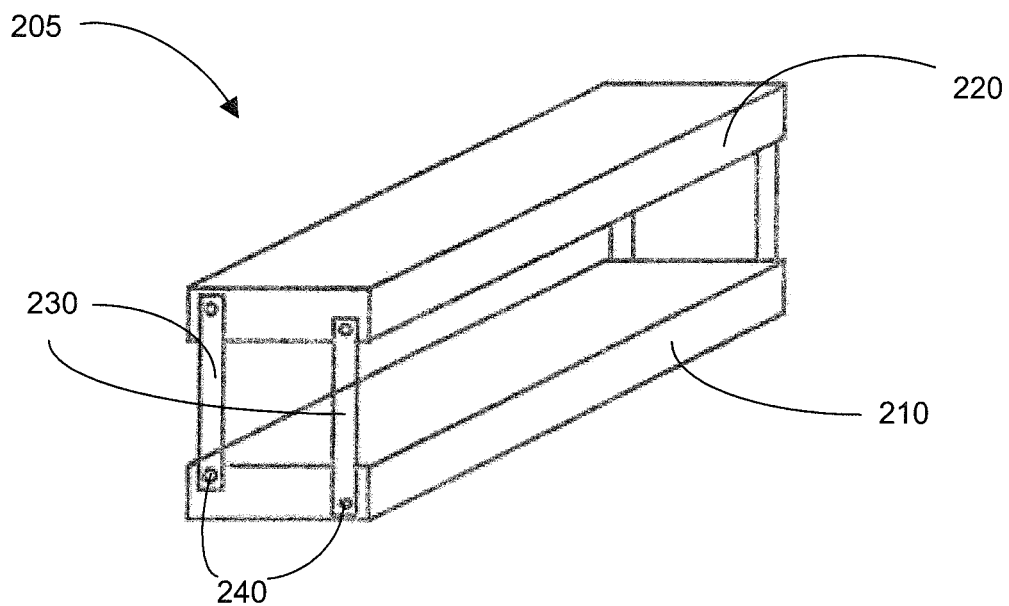
FIGS. 7A to 7C are schematics of a docking station according to another embodiment of the present invention.
Figure 7B:
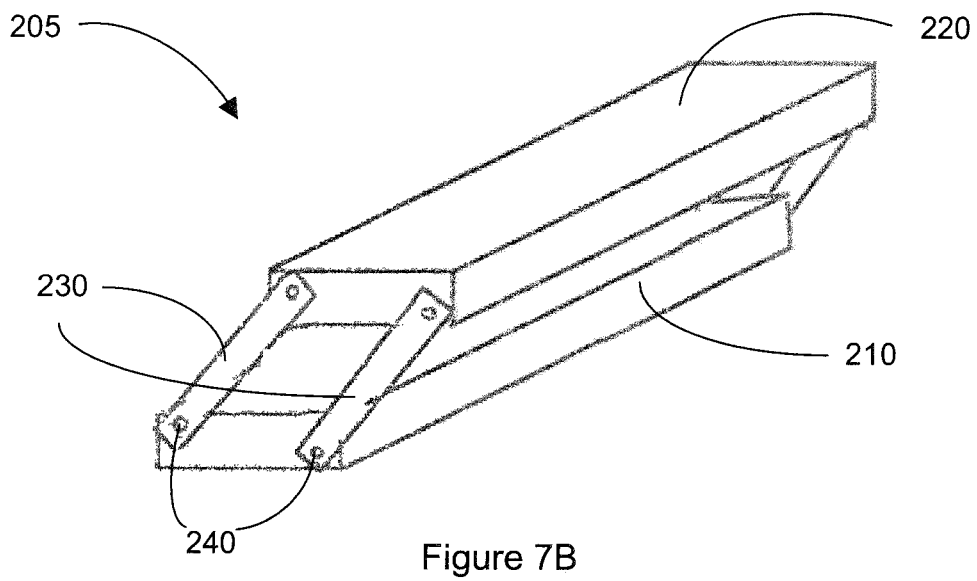
Figure 7C:
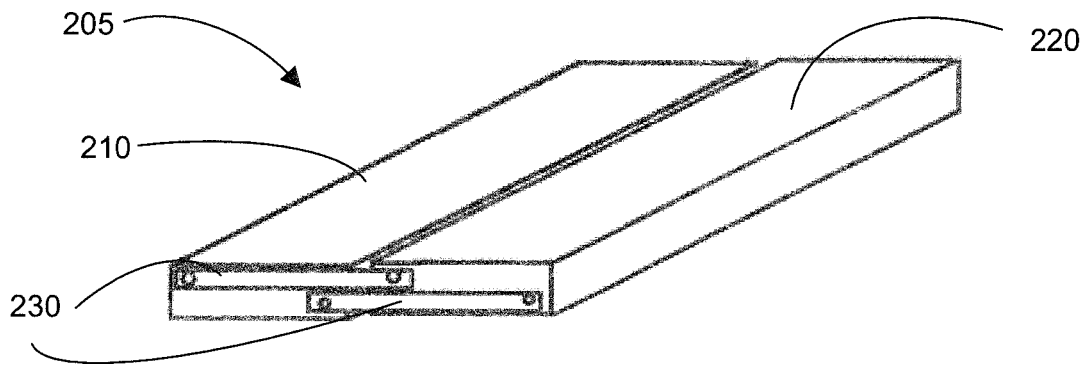

In an alternative embodiment as depicted in FIGS. 7A to 7C, there is provided a docking station 205 comprising a first frame 210 and a second frame 220 moveably coupled to the first frame 210 by an engagement assembly. In this embodiment, the second frame 220 is positioned directly above the first frame 210 when it is in a retracted position. The engagement assembly further comprises a plurality of pairs of parallel beams 230 pivotally attached to the first and second frames 210, 220 by a plurality of pivot connectors 240 so as to form a parallelogram when viewed from the side elevation (for example, as shown in at least FIGS. 7A and 7B). The pivot connectors 240 may be pin connections, hinge joints or any other mechanism that allows rotation of the parallel beams 230 about the longitudinal axis of the first and/or second frames 210, 220. Actuators (not shown) may also be provided on the docking station 205 so as to move the second frame from the retracted position (FIG. 7A) to an extended position (FIG. 7C) without any manual intervention.

In operation, upon actuation of the actuators, the parallel beams 230 will rotate about the pivot connectors so as to move the second frame 220 from the retracted position (as shown in FIG. 7A) to the extended position (as shown in FIG. 7C). In this illustrated embodiment, the parallel beams 230 may remain parallel to each other while the second frame 220 is moving from the retracted position to the extended position. In other words, the first and second frames 210, 220 will undergo a rotation in a parallelogram arrangement such that the first and second frames 210, 220 will remain parallel to each other during the rotation.

Figure 8A:
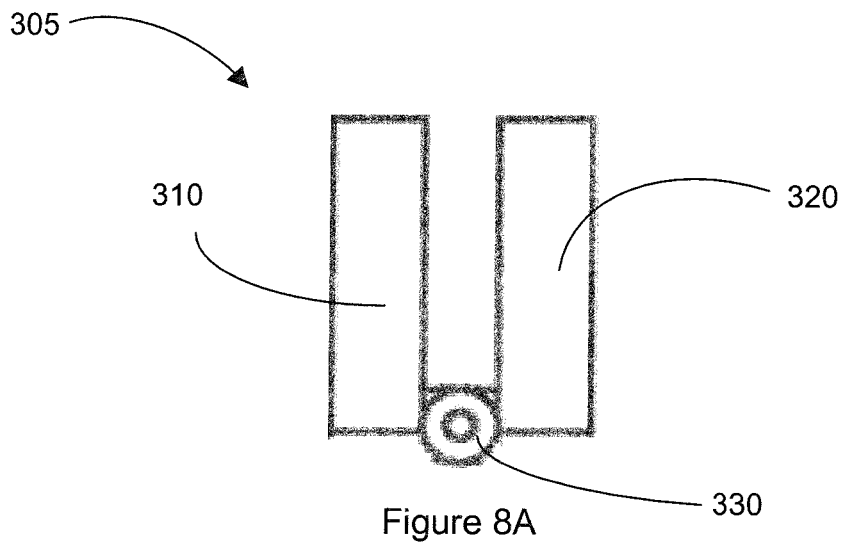
FIGS. 8A to 8C are schematics of a docking station according to another embodiment of the present invention.
Figure 8B:
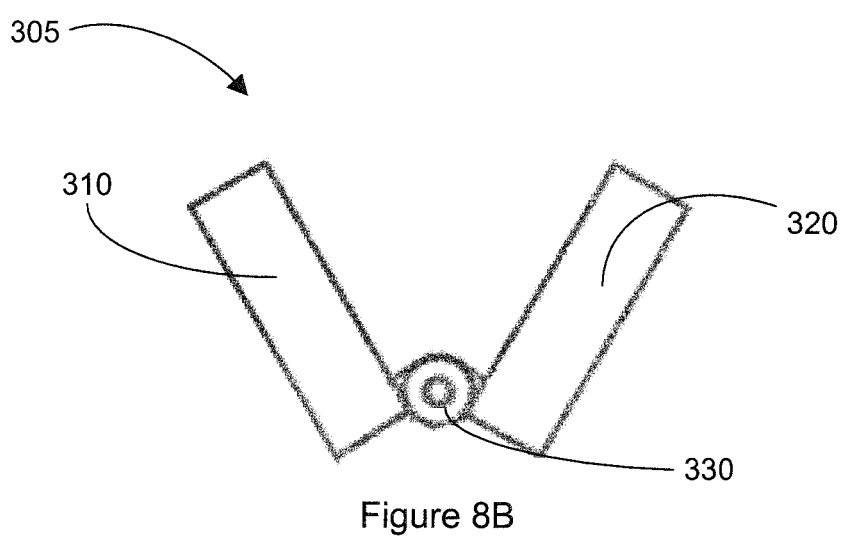
Figure 8C:
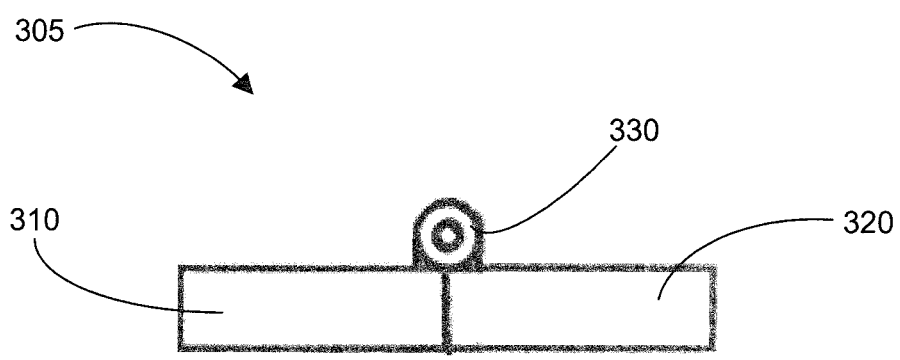

In yet another embodiment as shown in FIGS. 8A to 8C, the first frame 310 and the second frame 320 may be positioned vertically upright and parallel to each other in a retracted position (FIG. 8A). In this embodiment, the first and second frames 310, 320, may be pivotally coupled to each other by a hinge mechanism 330. The hinge mechanism may be pin connections, hinge joints, ball and socket joints or any other mechanism that allows rotation of the second frame about at least one principal axis. In operation, upon actuation of the actuators (not shown), both the first and second frames 310, 320 will rotate in opposite directions so as to arrive in the extended position (as shown in FIG. 8C).

Figure 9A:
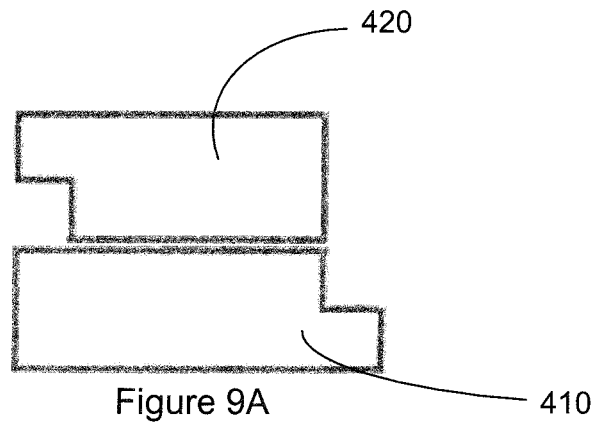
FIGS. 9A to 9C are schematics of a docking station according to another embodiment of the present invention.
Figure 9B:
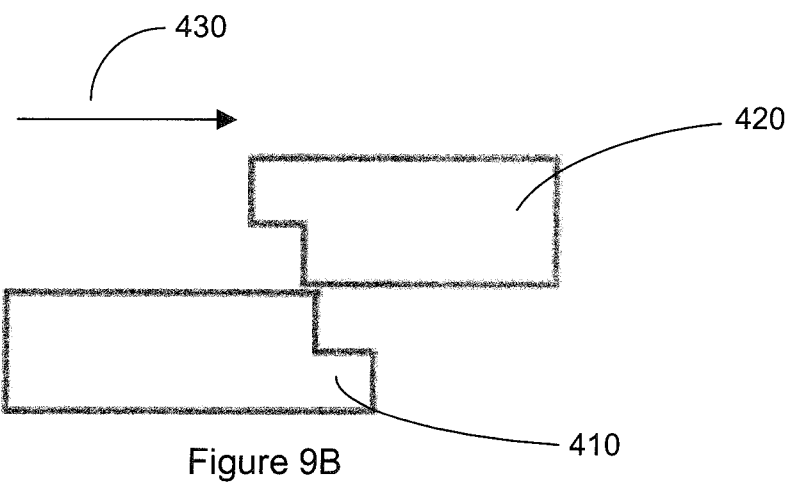
Figure 9C:
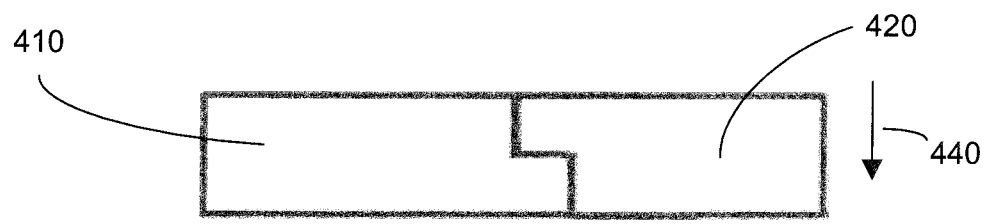

In further embodiments of the present invention as shown in FIGS. 9A to 9C, the second frame 420 may also be arranged to slide horizontally 430, and then vertically 440 relative to the first frame 410 so as to move from a retracted position as shown in FIG. 9A to an extended position as shown in FIG. 9C. In this embodiment, the second frame 420 may be coupled to the first frame 410 by linkages, and linear actuators are also provided on the linkages so as to move the second frame 420 relative to the first frame 410.

It is to be appreciated that the trailer may be a standard width trailer such as a low bed trailer, a standard flat bed trailer, or an AGV (driverless Automated Guided Vehicle). In this regard, for a flat bed trailer, it is also to be appreciated that the docking station 5 of the present invention may protrude slightly beyond the width of the standard flat bed trailer.

While the invention has been described with reference to specific embodiments, modifications and variations in design and/or detail may be made without departing from the spirit and scope of the invention.

The invention claimed is:

1. A docking station comprising:
 a first frame arranged to receive a first head block assembly; and
 a second frame moveably coupled to the first frame by an engagement assembly,
 wherein the engagement assembly is arranged to selectively move the second frame from a retracted position to an extended position so as to allow the second frame to receive a second head block assembly engageable by the docking station, and the second frame further comprises at least one rigger leg pivotally coupled to the second frame, the rigger leg is arranged to contact the ground and support the second frame when the second frame is in the extended position.

2. The docking station according to claim 1, wherein, in the retracted position, the second frame is positioned above the first frame.

3. The docking station according to claim 1, wherein the engagement assembly further comprises a pivoting mechanism arranged to allow rotation of the second frame relative to the first frame about at least one principal axis.

4. The docking station according to claim 1, wherein the rigger leg is arranged to retract into the second frame when the second frame is in the retracted position.

5. The docking station according to claim 1, wherein the first frame is mounted on a vehicle.

6. The docking station according to claim 1, wherein the first frame further comprises a plurality of corner flare guides arranged to engage a first head block assembly engageable by the docking station.

7. The docking station according to claim 1, wherein the engagement assembly further comprises a plurality of pairs of parallel beams arranged to allow rotation of the second frame relative to the first frame.

8. The docking station according to claim 1, wherein the engagement assembly further comprises a hinge mechanism arranged to allow rotation of both the first frame and the second frame about at least one principal axis.

9. The docking station according to claim 8, wherein the first and second frames rotate in opposite directions from each other.

10. The docking station according to claim 1, wherein the engagement assembly further comprises a plurality of linkages coupled to at least one linear actuator, the linear actuator arranged to selectively move the second frame horizontally, and then vertically, from the retracted position to the extended position.

11. The docking station according to claim 2, wherein the engagement assembly further comprises a pivoting mechanism arranged to allow rotation of the second frame relative to the first frame about at least one principal axis.

* * * * *